US008611109B2

(12) United States Patent
Roessler et al.

(10) Patent No.: US 8,611,109 B2
(45) Date of Patent: Dec. 17, 2013

(54) FLYBACK CONVERTER WITH AN ADAPTIVELY CONTROLLED RECTIFIER ARRANGEMENT

(75) Inventors: Werner Roessler, Neufahrn (DE); Michael Hausmann, Gleisdorf (AT)

(73) Assignee: Infineon Technologies AG, Neubiberg (DE)

( * ) Notice: Subject to any disclaimer, the term of this patent is extended or adjusted under 35 U.S.C. 154(b) by 493 days.

(21) Appl. No.: 12/895,530

(22) Filed: Sep. 30, 2010

(65) Prior Publication Data

US 2012/0081928 A1    Apr. 5, 2012

(51) Int. Cl.
*H02M 3/335* (2006.01)

(52) U.S. Cl.
USPC .............................. 363/21.14; 363/67; 363/89

(58) Field of Classification Search
USPC ......... 363/21.12, 21.14, 89, 67; 320/116, 121
See application file for complete search history.

(56) References Cited

U.S. PATENT DOCUMENTS

| 5,663,874 | A  | * | 9/1997  | Mader et al. ............... 363/21.14 |
| 6,055,170 | A  |   | 4/2000  | Yee |
| 6,377,477 | B1 | * | 4/2002  | Xie et al. .................... 363/21.14 |
| 6,407,934 | B1 | * | 6/2002  | Ishii et al. ................... 363/21.14 |
| 6,418,039 | B2 |   | 7/2002  | Lentini et al. |
| 6,815,936 | B2 | * | 11/2004 | Wiktor et al. ................. 323/282 |
| 6,992,906 | B1 | * | 1/2006  | Herbert ......................... 363/127 |
| 7,279,877 | B1 | * | 10/2007 | Tseng ............................ 323/284 |
| 7,791,913 | B1 |   | 9/2010  | Su |
| 7,804,276 | B2 |   | 9/2010  | Roessler |
| 2008/0049473 | A1 | * | 2/2008 | Sugahara et al. ............... 363/89 |
| 2009/0086514 | A1 | * | 4/2009 | Fornage et al. ............ 363/21.17 |
| 2009/0140693 | A1 | * | 6/2009 | Johnson, Jr. ................... 320/116 |
| 2010/0027298 | A1 | * | 2/2010 | Cohen ........................ 363/21.14 |
| 2010/0142229 | A1 | * | 6/2010 | Chen et al. ................. 363/21.02 |
| 2011/0063879 | A1 | * | 3/2011 | Murata ....................... 363/21.13 |

FOREIGN PATENT DOCUMENTS

| DE | 19882461 T1    | 7/2000 |
| DE | 60035100 T2    | 1/2008 |
| DE | 102008021090 A1 | 11/2008 |

\* cited by examiner

*Primary Examiner* — Adolf Berhane
*Assistant Examiner* — Fred E Finch, III
(74) *Attorney, Agent, or Firm* — Slater & Matsil, L.L.P.

(57) ABSTRACT

A flyback converter includes input terminals and output terminals. A transformer with a first winding and a second winding are inductively coupled. A first switching element is connected in series with the first winding and a first series circuit with the first switching element, the first winding being coupled between the input terminals. A rectifier arrangement is connected in series with the second winding and a second series circuit with the rectifier arrangement, the second winding being coupled between the output terminals. The rectifier arrangement includes a second switching element. A control circuit is configured in one drive cycle to switch on the first switching element for a first time period. After the first time period the second switching element is switched on for a second time period. A third time period is determined between an end of the second time period and the time at which the transformer assumes a predetermined transformer state. The control circuit is further configured to adapt the second time period to be applied in a subsequent drive cycle dependent on the second time period applied in the one drive cycle and the third time period is determined in the one drive cycle.

19 Claims, 4 Drawing Sheets

FLYBACK CONVERTER WITH AN ADAPTIVELY CONTROLLED RECTIFIER ARRANGEMENT

TECHNICAL FIELD

Embodiments of the present invention relate to a flyback converter and to a method of operating a flyback converter.

BACKGROUND

Flyback converters are widely used in the field of voltage conversion. Flyback converters can also be used in charge balancing systems which balance electrical charge between charge storage cells, like accumulator cells, in a charge storage system, like an accumulator.

A flyback converter includes input terminals for applying an input voltage, output terminals for providing an output voltage and connecting a load thereto, and a transformer with a first winding and a second winding. A switching element is connected in series with the first winding, and a rectifier element is connected in series with the second winding, wherein a first series circuit with the switching element and the first winding is connected between the input terminals, and a second series circuit with the second winding and the rectifier element is connected between the output terminals. The switching element can be switched-on and off. When the switching element is switched-on, energy is inductively stored in the transformer. This energy is transferred to the output terminals via the second winding and the rectifier element when the switching element is subsequently switched-off.

The rectifier element can be implemented as a diode, or can be implemented as a synchronous rectifier which includes a second switching element. The switching element of the synchronous rectifier is switched-on during those time periods in which the switching element connected in series with the first winding is switched-off and as long as energy is stored in the transformer. Usually, a rectifier element implemented as a synchronous rectifier has reduced losses compared with a rectifier element implemented as a diode. However, a synchronous rectifier requires an exact control of the on-times and the off-times of the second switching element in order to avoid power losses.

There is, therefore, a need for a flyback converter which has reduced power losses, and for a method for operating such flyback converter.

SUMMARY OF THE INVENTION

A first aspect relates to a flyback converter that includes input terminals and output terminals. A transformer with a first winding and a second winding are inductively coupled. A first switching element is connected in series with the first winding and a first series circuit with the first switching element, the first winding being coupled between the input terminals. A rectifier arrangement is connected in series with the second winding, a second series circuit with the rectifier arrangement and the second winding is coupled between the output terminals. The rectifier arrangement comprises a second switching element. A control circuit is configured in one drive cycle to switch on the first switching element for a first time period. After the first time period the second switching element is switched on for a second time period. A third time period is determined between an end of the second time period and the time at which the transformer assumes a predetermined transformer state. The control circuit is further configured to adapt the second time period to be applied in a subsequent drive cycle dependent on the second time period applied in the one drive cycle and the third time period determined in the one drive cycle.

A second aspect relates to a flyback converter arrangement that includes a pair of input terminals, and a plurality of n pairs of output terminals. A transformer with a first winding and with a plurality of n second windings is coupled with the first winding. A first switching element is connected in series with the first winding and a first series circuit with the first switching element, the first winding being coupled between the input terminals. A plurality of n rectifier arrangements, each rectifier arrangement connected in series with one second winding, and each series circuit with one of the plurality of second windings and one of the plurality of rectifier arrangements connected between one of the plurality of output terminal pairs, each rectifier arrangement comprising a second switching element. A control circuit is configured in one drive cycle to switch on the first switching element for a first time period. After the first time period of the plurality of the second switching elements is switched on for a second time period. A third time period is determined between an end of the second time period and the time at which the transformer assumes a predetermined transformer state. The control circuit is further configured to adapt the second time period associated with the one of the second switching elements in a subsequent drive cycle dependent on the second time period applied in the one drive cycle and the third time period determined in the one drive cycle.

A third aspect relates to a method for operating a flyback converter. The converter includes input terminals and output terminals. A transformer with a first winding and a second winding is inductively coupled. A first switching element is connected in series with the first winding, and a first series circuit with the first switching element, the first winding being coupled between the input terminals. A rectifier arrangement is connected in series with the second winding, and a second series circuit with the rectifier arrangement, the second winding being coupled between the output terminals. The rectifier arrangement comprises a second switching element. The method includes switching-on the first switching element for a first time period in one drive cycle. The second switching element is switched on for a second time period after the first time period. A third time period is determined between an end of the second time period and the time at which the transformer assumes a predetermined transformer state. The second time period is adapted to be applied in a subsequent drive cycle dependent on the second time period applied in the one drive cycle and the third time period determined in the one drive cycle.

BRIEF DESCRIPTION OF THE DRAWINGS

Embodiments will now be explained with reference to drawings. The drawings serve to illustrate the basic principle, so that only features necessary for understanding the basic principle are illustrated. The drawings are not to scale. Like reference characters denote like features with the same meaning throughout the drawings.

DETAILED DESCRIPTION OF ILLUSTRATIVE EMBODIMENTS

Figure 1:
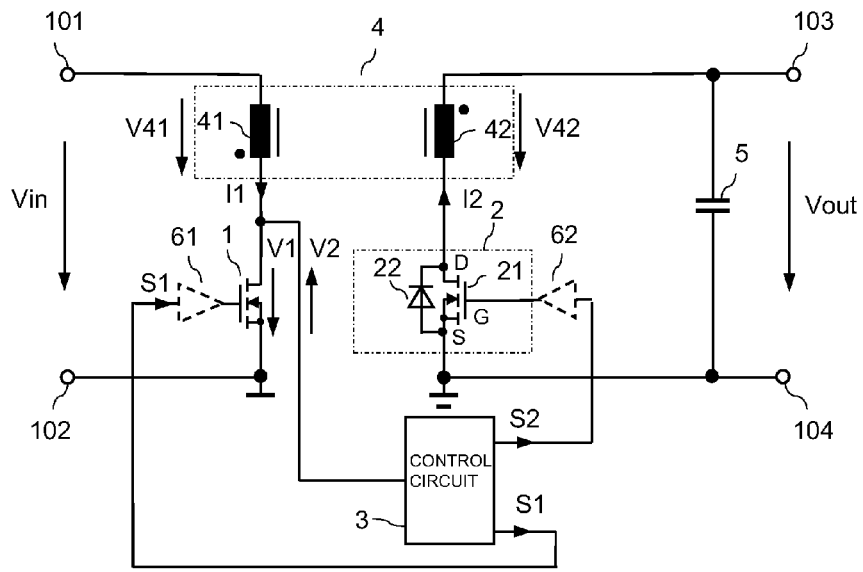
FIG. 1 illustrates a first embodiment of a flyback converter including a transformer with one first winding and one second winding, and a rectifier arrangement connected in series with the second winding.

FIG. 1 schematically illustrates a first embodiment of a flyback converter. The flyback converter includes a pair of input terminals 101, 102 for applying an input voltage Vin. The input voltage Vin is, in particular, a DC voltage which can be supplied from any suitable DC voltage source. A DC voltage source is, for example, a battery or an accumulator. The converter further includes a pair of output terminals 103, 104 for providing an output voltage Vout. According to one embodiment a capacitive charge storage element, like a capacitor 5, an accumulator, or an accumulator cell, is connected between the output terminals 103, 104.

The converter further includes a transformer 4 with a first winding 41, which will also be referred to as primary winding in the following, and a second winding 42, which will also be referred to as secondary winding in the following. A first switching element 1 is connected in series with the primary winding 41, wherein a first series circuit with the primary winding 41 and the first switching element 1 is coupled between the input terminals 101, 102. In the embodiment illustrated in FIG. 1 the first switching element 1 is implemented as a MOSFET, in particular, an n-MOSFET. However, this is only an example. Any other type of electronic switching element, like a p-MOSFET, an IGBT or bipolar junction transistor (BJT) may be used as well.

The rectifier arrangement 2 is connected in series with the secondary winding 42, wherein a second series circuit with the secondary winding 42 and the rectifier arrangement 2 is coupled between the output terminals 103, 104. In the embodiment illustrated in FIG. 1 the rectifier arrangement 2 is implemented as a MOSFET, in particular an n-MOSFET.

Figure 2:
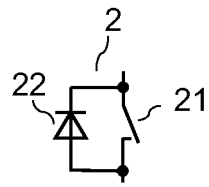
FIG. 2 illustrates the basic configuration of a rectifier arrangement.

Referring to FIG. 2, the rectifier arrangement 2 in general includes a switching element 21 and a rectifier element 22, like a diode, connected in parallel with the switching element 21. A switching element 21 and a parallel diode 22 is inherent in the n-MOSFET according to FIG. 1, wherein the diode 22 is implemented as the body diode of the MOSFET, and the switching element 21 is formed by the MOSFET itself. Or in other words, the MOSFET 2 is a switching element 21 with an integrated diode 22. The switching element 21 of the rectifier arrangement 2 will also be referred to as second switching element in the following.

In an n-MOSFET, like the MOSFET illustrated in FIG. 1, the polarity of the body diode is such that a current can flow through the MOSFET when it is switched-off and when a positive voltage is applied between its source terminal S and its drain terminal D. In a p-MOSFET a current can flow when the MOSFET is switched off and when a negative voltage is applied between its source terminal S and its drain terminal D.

Referring to FIG. 1, the flyback converter further includes a control circuit 3 which provides a first drive signal S1 which is configured to switch the first switching element 1 on or off, and which provides a second drive signal S2 which is configured to switch the second switching element 21 on or off. The switching elements 1, 2 which are implemented as MOSFETs in the embodiment of FIG. 1, receive the drive signals S1, S2 at their drive or gate terminals G. Optionally driver circuits 61, 62 are connected between the control circuit 3 and the switching elements 1, 2. These driver circuits 61, 62 are configured to amplify the drive signals S1, S2 to signal levels which are suitable for driving the first and second switching elements 1, 2. These driver circuits 61, 62 can be implemented like conventional driver circuits which are configured for driving transistors, like the first and second transistors 1, 2 of FIG. 1. According to one embodiment, means (not shown) for galvanically decoupling the control circuit 3 and the driver circuits 61, 62 are arranged between the control circuit 3 and the driver circuits 61, 62. These means include, for example, a transformer or an optocoupler, which transmits the control signals S1, S2 from the control circuit 3 to the driver circuits 61, 62 but allows the control circuit 3, on the one hand, and the driver circuits 61, 62, on the other hand, to have different reference potentials.

The basic operating principle of the flyback converter will now be explained with reference to FIG. 3 in which timing diagrams of the first drive signal S1, a first current I1 through the first switching element 1, a first voltage V1 across the first switching element 1, the second drive signal S2 of the second switching element 2, a second current I2 through the second switching element 2, and a voltage V42 across the secondary winding 42 are illustrated. The timing diagrams in FIG. 3 start at a first time t1 at which the first switching element 1 is switched-on. The first switching element 1 is switched-on when the first drive signal S1 assumes an on-level. For explanation purposes it is assumed that on-levels of the first and the second drive signals S1, S2 are high-signal levels, while off-levels at which the switching elements 1, 2 are switched-off, are low-signal levels. However, this is only an example, the on-level, dependent on the type of the switching element, could also be a low-signal level, while the off-level could be a high-signal level.

Figure 3:
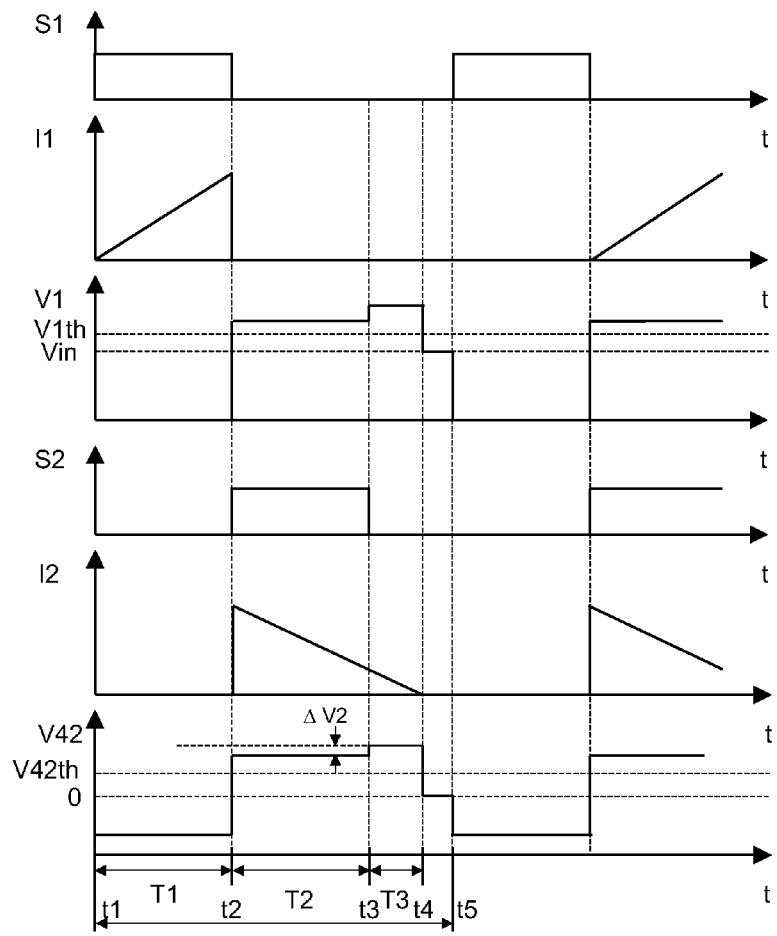
FIG. 3 shows timing diagrams illustrating the basic principle of the flyback converter of FIG. 1.

Referring to FIG. 3, the first switching element 1 is switched on for a first time period T1, which will also be referred to as first on-period in the following. During this first on-period T1 the first current I1 through the primary winding 41 increases. For explanation purposes it is assumed that the voltage drop V1 across the first switching element 1 is negligible relative to the input voltage Vin, so that the voltage across the primary winding 41 (not illustrated in FIG. 3) approximately corresponds to the input voltage Vin. The primary winding 41 and the secondary winding 42 have opposite winding senses, so that a voltage V41 across the primary winding 41 and a voltage V42 across the secondary winding 42 have different polarities. During the first on-period T1 the voltage V41 across the primary winding 41 is a positive voltage, so that the voltage V42 across the secondary winding 42 is a negative voltage. The second switching element 21 is switched-off during the first on-period T1, and a polarity of the rectifier element 22, which in the embodiment of FIG. 1 is the body diode of the MOSFET, is such that no current can flow through the rectifier element 22 during the first on-period T1, i.e., when the voltage V42 across the secondary winding V42 is negative. Thus, the second current I2 is zero during the first on-period T1.

The rectifier arrangement 2, and, more specifically, the second switching element 21, is switched-on after the first switching element 1 has been switched-off. In the embodiment illustrated in FIG. 3 the second switching element 21 is switched-on at the same time t2 at which the first switching element 1 is switched-off. However, there could also be time delay (not shown) between the time t2 of switching-off the first switching element 1 and the time of switching-on the second switching element 2.

When the first switching element 1 is switched-off, the voltage V41 across the primary winding 41 reverses its polarity and the voltage V1 across the first switching element 1 increases to a voltage level higher than the input voltage Vin. The voltage V42 across the second winding 42 also reverses its polarity, wherein the absolute value of the voltage V42 approximately equals the output voltage Vout plus a voltage drop across the second switching element 21. For explanation purposes it can be assumed that the voltage drop across the switched-on second switching element 21 is negligible relative to the output voltage Vout, so that the voltage V42 across the second winding 42 approximately equals the output voltage Vout. The second switching element 2 is switched on for a second time period T2 which ends at a third time t3 in the embodiment illustrated in FIG. 3. During the second time period T2 a second current I2 flows from the secondary winding 42 to the output terminals 103, 104 and the capacitive storage element 5, respectively. During this second time period the energy that has been previously stored in the transformer 4 during the first on-period is at least partly transferred from the transformer to the output terminals 103, 104 and the capacitive storage element 5, respectively. The use of the second switching element 21 in series with the secondary winding 42 instead of a conventional diode has the advantage that the switching element 21 in its switched-on state causes lower power losses than a diode, because the voltage drop across a switching element 21, like a modern MOSFET, is significantly lower than the forward voltage of a conventional diode.

However, the second switching element 21, unlike a conventional diode, requires an active control in order to prevent the second switching element from being switched-on during those times in which the transformer 4 has completely transferred the stored energy to the capacitive storage element 5. If the second switching element 2 would be switched-on during those time periods, a current would flow from the capacitive charge storage element 5 into the transformer 4, which would result in increased power losses.

Referring to FIG. 3, the second switching element 2 is switched-off at a third time t3 before the second current I2 has decreased to zero, i.e., before the transformer 4 has completely transferred the stored energy to the output terminals 103, 104. When the switching element 21 is switched-off, the rectifier element 22, which in the MOSFET according to FIG. 1 is the body diode, allows the second current I2 to flow. Since the forward voltage of the body diode is higher than the voltage drop across the switching element in its on-state, there is a slight increase in the voltage V42 across the secondary winding 42, and also in the voltage V41 across the primary winding 41. After the energy stored in the transformer 4 has been transferred to the capacitive charge storage element 5, the voltage V42 across the secondary winding drops to zero and the voltage V1 across the first switching element 1 drops to the input voltage Vin. At this time the body diode 22 prevents a current to flow from the charge storage element 5 into the secondary winding 42 of the transformer 4. A time period between the third time t3 when the second switching element 2 is switched-off, and a fourth time t4 when the second current I2 decreases to zero, will be referred to as third time period T3 in the following.

Referring to FIG. 3, a new drive cycle of the first and second switching elements starts at a time t5. The duration T of one drive cycle is defined by the time difference between the first time t1 and the fifth time t5 wherein in one drive cycle the first switching element 1 is switched-on for the first time period T1, and the second switching element 2 is switched-on for the second time T2. In other words: Within one drive cycle the first drive signal S1 includes a signal pulse with a duration that equals the first time period T1, and the second drive signal S2 includes a signal pulse with a duration that equals the second time period T2.

In each drive cycle electrical energy is transferred from the input terminals 101, 102 to the output terminals 103, 104. According to one embodiment there is a plurality of subsequent drive cycles, wherein the durations of the individual drive cycles are identical, and wherein the first on-period T1 is identical in each of the individual drive cycles.

Figure 4:
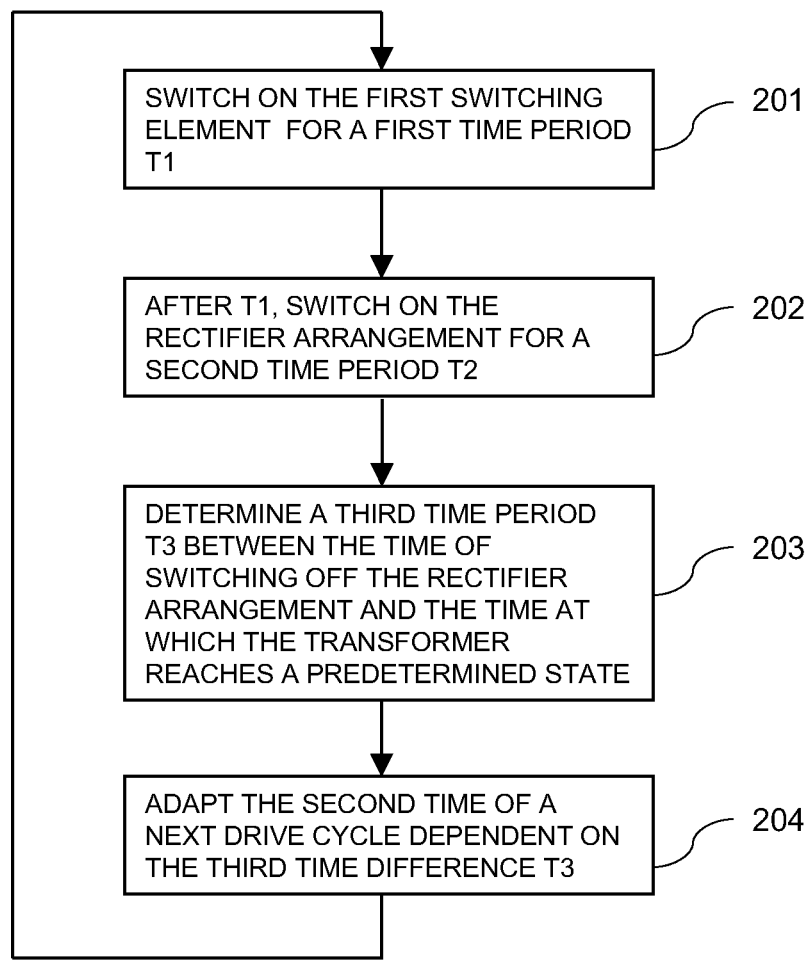
FIG. 4 illustrates a method for adapting the on-period of a switching element in the rectifier arrangement.

In order to reduce the power losses that occur on the secondary side of the transformer 4, it is desired to minimize the third time period T3 during which the second current I2 flows through the rectifier element 22 of the rectifier arrangement 2. A method for minimizing the third time period T3 or maximizing the second time period t2 will now be explained with reference to FIG. 4, in which individual method steps of such method are illustrated. The method steps illustrated in FIG. 4 serve to illustrate the method during one drive cycle. It goes without saying that this method can be repeated with each new drive cycle.

In a first step 201 the first switching element is switched on for the first time period T1. In a second step 202 the rectifier arrangement 2, i.e., more specifically, the second switching element 21 of the rectifier arrangement 2, is switched on for the second time period T2 at the end or after the end of the first time period T1. In a next step 203 the third time period T3 between the time of switching-off the rectifier arrangement 2, which is the end of the second time period T2, and the time at which the transformer 4 reaches a predetermined state is determined. In FIG. 3, the time of switching off the rectifier arrangement 2 is the third time T3. The predetermined state of the transformer is, for example, a state at which no energy is stored in the transformer 4. In FIG. 3, the time at which the transformer reaches this "zero-energy" state is the fourth time t4.

The method further includes a method step 204 in which the second time T2 for which the rectifier arrangement is to be switched on in one subsequent drive cycle is adapted dependent on the determined third time difference T3. This will be explained in the following.

In the following T2($i$) and T3($i$) denote the second and third time period in a first drive cycle i. T2($i$+1) denotes the second time in a second drive cycle i+1. In general, the second time period T2($i$+1) in the second drive cycle is dependent on the second time period T2($i$) of the first drive cycle i, i.e.:

$$T2(i+1)=f(T2(i)) \quad (1).$$

In other words: T2(I+1) is a function f(.) of T2($i$). According to one embodiment the control circuit 3 is configured to incrementally increase the second time period T2 as long as the third time period T3 is larger than a predetermined threshold value $T3_{th}$. In this case:

$$T2(i+1)=T2(i)+\Delta T2 \text{ if } T3(i)>T3_{th} \quad (2).$$

$\Delta T2$ according to one embodiment is a fixed value. According to another embodiment $\Delta T2$ is a function of the third time period T3, i.e., $$\Delta T2 = f(T3(i)) \quad (3).$$

In this case, $\Delta T2$ is, for example, a fixed percentage, like 50%, of the third time period T3. In this embodiment the second time period increases faster from drive cycle to drive cycle when the third time period T3 is a relatively long period.

When the operation of the flyback converter begins, the second time period T2 is set to an initial value $T2_0$. This initial value $T2_0$ is, for example, set to a small value, wherein the second time period is then increased from drive cycle to drive cycle in order to minimize the third time period T3. "A small value" in connection with the initial value $T2_0$ means that $T2_0$ is definitely smaller than the time required for demagnetizing the transformer 4 after the transformer has been magnetized for the (fixed) first time T1.

The second time period T2 can be adapted in each drive cycle dependent on the third time period T3 determined in the previous drive cycle. According to another embodiment the third time period T3 is evaluated only every m, with m>1, drive cycles, so that the second time period T2 is only adapted in every m-th drive cycle. According to one embodiment the third time period T3 is evaluated or determined in a number of subsequent drive cycles, and the second time period is adapted dependent on these third time periods determined in these number of drive cycles. According to one embodiment the second time period is, for example, adapted dependent on the mean value of the third time periods evaluated during the number of drive cycles.

In order to detect the time when the transformer reaches the predetermined transformer state the control circuit 3 is, for example, configured to either evaluate the first voltage V1 across the first switching element 1, or to evaluate the voltage V41 across the primary winding 41, or to evaluate the voltage V42 across the secondary winding 42. In the embodiment illustrated in FIG. 1 the control circuit 3 is configured to evaluate the voltage V1 across the first switching element 1. Referring to FIG. 3 the voltage V1 drops to the value of the input voltage Vin when the transformer 4 has transferred the energy stored therein to the output terminals 103, 104. The control circuit 3 is configured to compare the first voltage V1 with a threshold voltage V1th, wherein the presence of the zero-energy state of the transformer 4 is detected, when the first voltage V1 decreases below the threshold value V1th.

Figure 5:
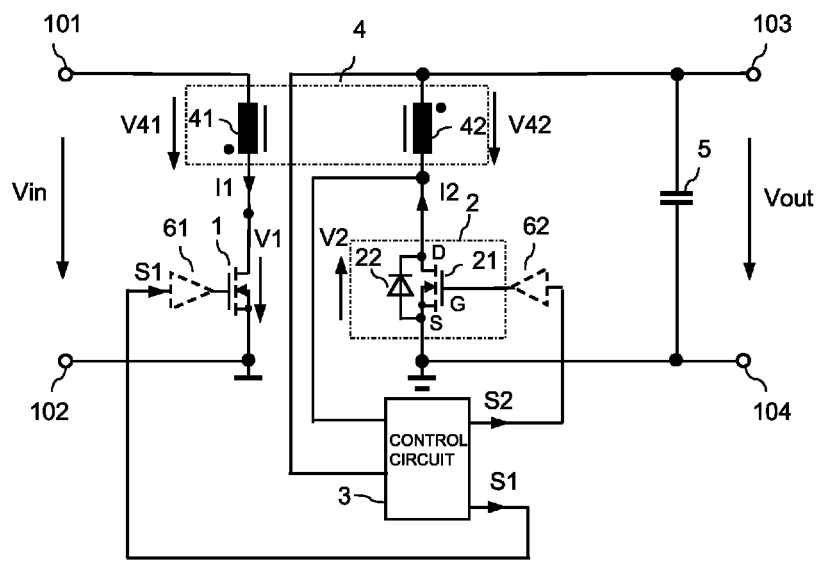
FIG. 5 illustrates a second embodiment of a flyback converter.

In a further embodiment which is illustrated in FIG. 5 the control circuit 3 receives the voltage V42 across the secondary winding 42 and is configured to evaluate this voltage V42 in order to detect the zero-energy state of the transformer 4. Referring to FIG. 3, the voltage V42 decreases to zero, when the transformer 4 reaches the zero-energy state. According to one embodiment the control circuit 3 is configured to compare the voltage V42 with a second threshold value V42th wherein the zero-energy state of the transformer 4 is detected when the voltage V42 across the secondary winding decreases below the second threshold value V42th.

Alternatively, the control circuit 3 can be configured to evaluate the voltage V41 across the primary winding 41. The voltage V41 (which is not illustrated in FIG. 3) is the difference between the voltage V1 across the switching element 1 and the input voltage Vin. This voltage V41 decreases to zero when the transformer 4 reaches its zero-energy state. According to one embodiment the control circuit 3 is configured to compare the voltage V41 with a third threshold value V41th, wherein the zero-energy state is detected when the voltage V41 decreases below the third threshold value V41th.

The control circuit 3 can be implemented as an analog or as a digital circuit. A block diagram of an embodiment of the control circuit 3 is illustrated in FIG. 5.

Figure 6:
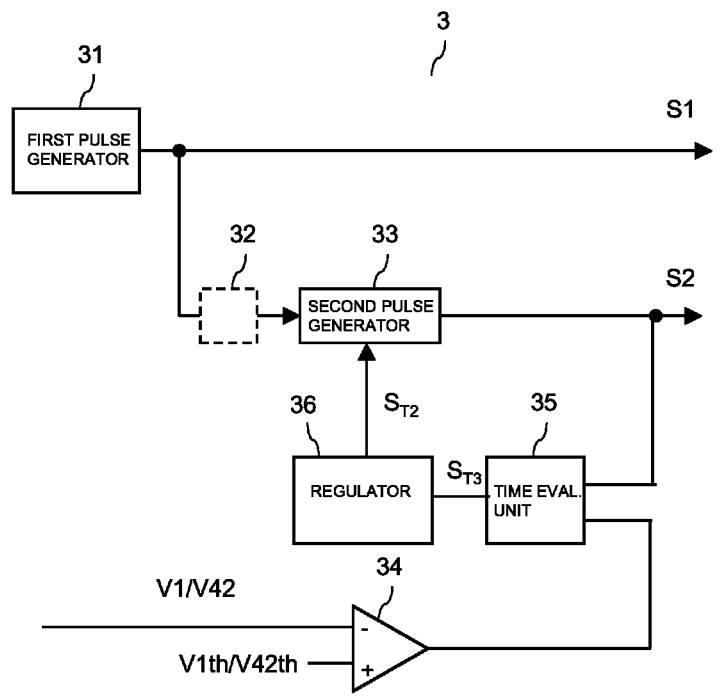
FIG. 6 schematically illustrates an embodiment of a control circuit of a flyback converter.

Referring to FIG. 6, the control circuit 3 includes a first pulse generator 31 which is configured to generate the first drive signal S1. Referring to FIG. 3, the first drive signal S1 includes a sequence of pulses with a duration corresponding to the first time period T1. The time distance between two subsequent pulses is T, which is the duration of one drive cycle.

The control circuit 3 further includes a second pulse generator 33 which is configured to generate the second drive signal S2. The second pulse generator 33 includes an output terminal for providing a second drive signal S2, and two input terminals. A first input terminal for receiving the first drive signal S1, and a second input terminal for receiving a second time period control signal $S_{T2}$. The first drive signal S1 received at the first input terminal determines the time at which the second pulse generator 33 generates a second signal pulse, and the second time period control signal $S_{T2}$ determines the duration of the signal pulse. According to one embodiment the second pulse generator 33 is configured to generate a second pulse with each falling edge of the signal pulses generated by the first pulse generator 31. In this case the second signal pulse is generated immediately when the first signal pulse ends. The first switching element 1 is switched on during the duration of the signal pulses of the first drive signal S1, and the second switching element 21 is switched on during the time period of the signal pulses of the second drive signal S2, so that the second switching element 2 is switched on at the time of switching off the first switching element 1.

Optionally, a delay element 32 is connected upstream to the first input of the second pulse generator 33. This delay element 32 delays the signal pulse received at the first input of the second pulse generator 33, so that there is a time delay between the end of a signal pulse of the first drive signal S1 and the begin of a signal pulse of the second drive signal S2 or, in other words, there is a delay time between switching off the first switching element 1 and switching on the second switching element 21.

The control circuit 3 further includes a detection unit for detecting the predetermined state of the transformer. In the embodiment of FIG. 6 this detection unit includes a comparator 34 which receives the voltage V1 across the first switching element 1 or the voltage V42 across the secondary winding 42 at a first terminal and which receives the first threshold value V1th or the second threshold value V42th at a second terminal. The comparator 34 can be implemented as an analog or a digital comparator. The first or second threshold values V1th, V42th can be provided by any suitable circuit that is configured to provide a reference value like the first or second threshold values V1th, V42th.

According to one embodiment, the first or second threshold voltages V1th, V42th are not fixed voltages, but are calculated dependent on the first voltage V1 or the second voltage V42 during the second time period T2 or the third time period. The first threshold voltage V1th is, for example:

$$V1\text{th} = Vin + (V1\max - Vin) \cdot k1 \quad (4a)$$

while the second threshold voltage V12th is, for example:

$$V1\text{th} = V42\max \cdot k42 \quad (4b)$$

where V1max and V42max are the maximum of the first voltage V1 and the second voltage V42, respectively, during the second or third time periods. k1, k42 are fixed weighting factors which are between 0 and 1. According to one embodiment, these weighting factors are between 0 and 0.5. The input voltage Vin is either known, or can be measured. The maximum voltages V1max or V42max can be measured during the second or third time periods T2, T3 (see FIG. 3).

A time evaluation unit 35 receives the second drive signal S2 and an output signal of the comparator 34. The time evaluation unit 35 is configured to evaluate the time difference between the time of switching-off the second switching element 21, which corresponds to the end of a signal pulse in the second drive signal S2, and the time at which the detection unit 34 detects the predetermined state of the transformer 4. The output signal of the comparator 34 assumes one of two different signal levels: A first signal level when the transformer 4 is not in the predetermined transformer state, and a second signal level, when the transformer 4 is in the predetermined signal state. The time evaluation unit 35 is configured to evaluate a change in the signal level of the output signal of the comparator 34 in order to detect the time, when the transformer 4 reaches the predetermined transformer state, and in order to determine the third time period T3. The time evaluation unit 35 is, for example, implemented as a counter which starts counting with a falling edge of the second drive signal S2 and which stops counting when the output signal of the comparator 34 indicates that the transformer has reached the predetermined transformer state. A counter value of such counter represents the third time period T3.

The time evaluation unit 35 provides an output signal $S_{T3}$ which represents the third time period. A regulator 36 receives the third time period signal $S_{T3}$ and generates the second time period signal $S_{T2}$ dependent on the third time period signal $S_{T3}$. The regulator 36 has one of the functionalities explained hereinabove for generating the second time period T2 dependent on the third time period T3.

Figure 7:
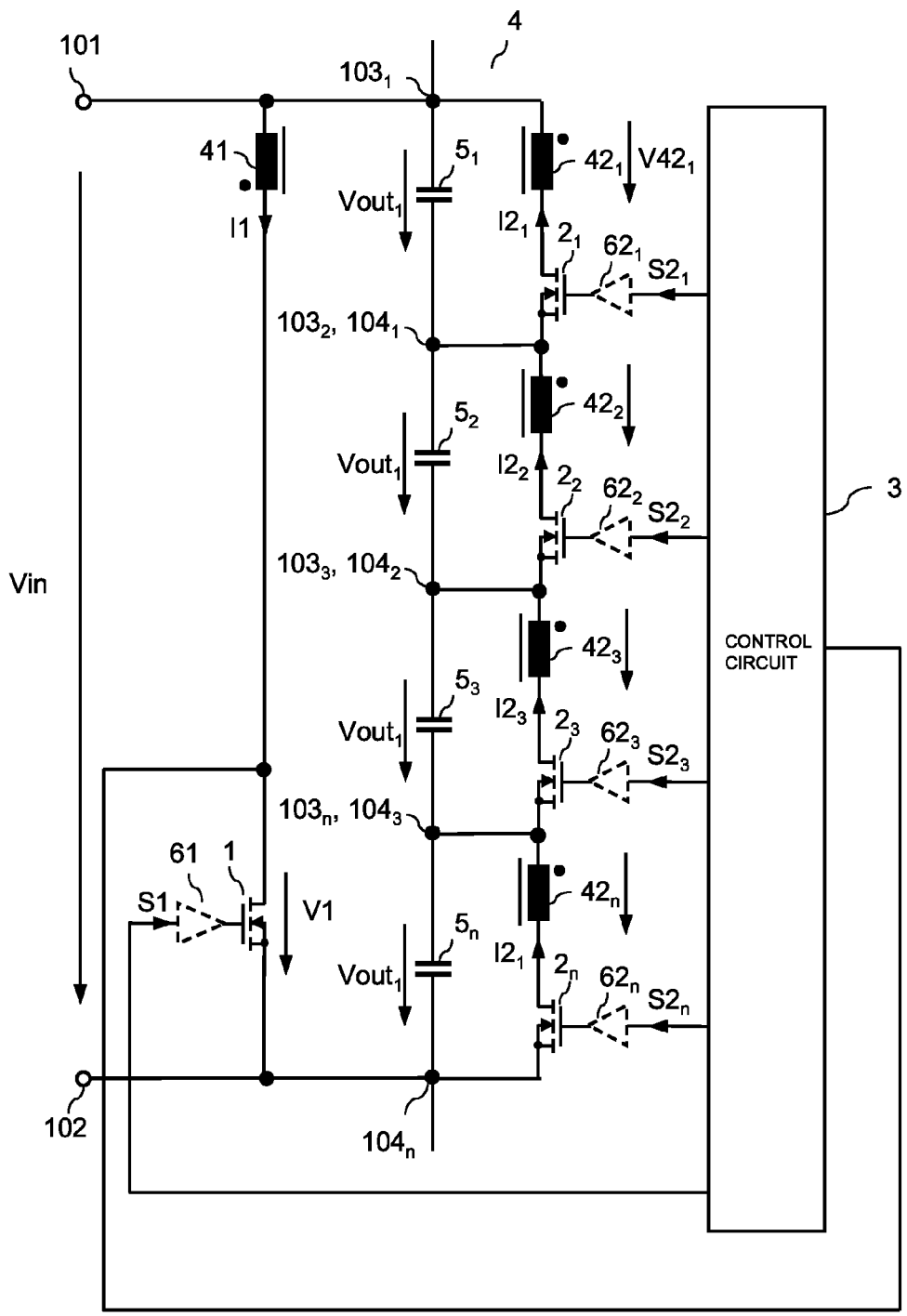
FIG. 7 illustrates a second embodiment of a flyback converter including a transformer with one first winding and a plurality of second windings, and rectifier arrangements connected in series with the second windings.

FIG. 7 illustrates a further embodiment of a flyback converter. This flyback converter includes a plurality of n secondary windings $42_1$, $42_2$, $42_3$, $42_n$ which are inductively coupled with the primary windings 41. The flyback converter of FIG. 7 includes n=4 second windings $42_1$-$42_n$. However, this is only an example.

A rectifier arrangement $2_1$, $2_2$, $2_3$, $2_n$ is connected in series with each of the secondary windings $42_1$, $42_n$, wherein each of the series circuits with one secondary windings $42_1$-$42_n$ and one rectifier arrangement $2_1$, $2_n$ is connected between one of n pairs of output terminals. In the embodiment of FIG. 7 a first one of the series circuits is connected between a first pair $103_1$, $104_1$ of output terminals, a second series circuit is connected between a second pair $103_2$, $104_2$ of output terminals, a third series circuit is connected between a third pair $103_3$, $104_3$ of output terminals, and a fourth series circuit is connected between a fourth pair $103_n$, $104_n$ of output terminals. In the flyback converter arrangement of FIG. 7 the second windings and the rectifier arrangements are cascaded such that two neighboring series circuits have one output terminal in common, so that the n pairs of output terminals are formed by n+1 output terminals.

The flyback converter arrangement includes a control circuit 3 which is configured to drive the first switching element 1 connected in series with the first winding 41 and which is configured to individually drive the rectifier arrangements $2_1$-$2_n$. The control circuit 3 is configured to cyclically drive the first switching element 1 and the rectifier arrangements $2_1$-$2_n$, wherein in each drive cycle the first switching element 1 is switched-on for the first time period T1, and one of the rectifier arrangements is switched on for a second time period T2. The control circuit 3 is configured to individually adapt the second time period associated with each of the rectifier arrangements. The control circuit 3 includes, for example, a first pulse generator, like the first pulse generator 31 of FIG. 6, and a transformer state detection unit, like the comparator 34 of FIG. 6, and includes for each of the rectifier arrangements a second pulse generator, a regulator, and a time evaluation unit, like the second pulse generator 33, the regulator 36 and the time evaluation unit 35 of FIG. 6.

The flyback converter of FIG. 7 is connected to support a charge balancing in an accumulator arrangement which includes a plurality of accumulator cells $5_1$, $5_2$, $5_3$, $5_n$ connected in series. The overall arrangement is connected between the input terminals 101, 102, and each of the accumulator cells $5_1$, $5_2$, $5_3$, $5_n$ is connected between one of the n output terminal pairs. When the first switching element 1 is switched on energy is taken from the overall arrangement and is stored in the transformer, in a first phase of each drive cycle. In a second phase of each drive cycle, when the first switching element 1 is switched-off and the rectifier arrangement of one of the accumulator cells $5_1$, $5_2$, $5_3$, $5_n$ is switched on, the energy stored in the transformer 4 is fed back into the one of the accumulator cells $5_1$, $5_2$, $5_3$, $5_n$ which has its rectifier arrangement switched on. According to one embodiment, the control circuit 3 is configured to measure the voltages of the individual accumulator cells $5_1$, $5_2$, $5_3$, $5_n$ and, in the second phase of each drive cycle, to switch on the rectifier arrangement of that accumulator cell $5_1$, $5_2$, $5_3$, $5_n$ which has the lowest voltage compared with the voltages of the other accumulator cells. In this case, only the accumulator cell with the lowest voltage is charged. This method allows to selectively charge an individual accumulator cell at the expense of the overall accumulator arrangement and, therefore, allows to balance the charges of the individual accumulator cells.

In the flyback converter arrangement of FIG. 7, in one drive cycle the first switching element 1 is switched on for the first time period (T1 in FIG. 3) and one of the rectifier arrangements $2_1$-$2_n$ is switched on for a second time period (T2 in FIG. 3). According to one embodiment, the control circuit 3 is configured to adjust the second time period individually for each of the rectifier arrangements $2_1$-$2_n$. For this, n different second time periods $T2_1$, $T2_2$, $T2_3$, $T2_n$ can be stored in the control circuit 3 wherein each of these second time periods $T2_1$-$T2_n$ is assigned to one of the rectifier arrangements $2_1$-$2_n$ and can be adjusted individually, i.e., can be adjusted independent of the second time periods of the other rectifier arrangements. The adjustment of each of these second time periods can be performed in accordance with one of the methods explained hereinbefore.

According to a further embodiment, one of the accumulator cells $5_1$, $5_2$, $5_3$, $5_n$ is selectively discharged in favor of the overall accumulator arrangement. For this, the rectifier arrangement $2_1$, ..., $2_n$ assigned to that accumulator cell which is to be discharged is switched on for the first time period T1 of a switching cycle, and the first switching element 1 is switched on for the second time period T2 of the switching cycle. When the rectifier arrangement is switched-on during the first time period T1 energy is taken from one accumulator cell in the first phase of each drive cycle. In a second phase of each drive cycle, when the first switching element 1 is switched on and the rectifier arrangement is switched off, the energy stored in the transformer 4 is fed back into the overall accumulator arrangement. According to one embodiment, the control circuit 3 is configured to measure the voltages across the accumulator cells $5_1$, $5_2$, $5_3$, $5_n$ and is configured to selectively discharge that accumulator cell which has the highest voltage in order to balance the charges of the individual accumulator cells.

Finally it should be mentioned that features which have been explained in connection with one embodiment can be combined with features of each of the other embodiments even if this is not explicitly stated hereinbefore.

What is claimed is:
1. A flyback converter, comprising:
input terminals and output terminals;

a transformer with a first winding and a second winding, which are inductively coupled;
a first switching element coupled in series with the first winding such that a first series circuit with the first switching element and the first winding is coupled between the input terminals;
a rectifier arrangement coupled in series with the second winding such that a second series circuit with the rectifier arrangement and the second winding is coupled between the output terminals, the rectifier arrangement comprising a second switching element; and
a control circuit configured in one drive cycle to switch on the first switching element for a first time period, after the first time period to switch on the second switching element for a second time period, to determine a third time period between an end of the second time period and a time at which the transformer assumes a predetermined transformer state, wherein:
  the control circuit determines the time at which the transformer assumes the predetermined transformer state by comparing a first voltage with a threshold, the first voltage comprising one of a voltage across the first switching element and a voltage across the second winding,
  the control circuit determines the threshold by determining a maximum value of the first voltage during the second and third time periods and weighting the determined maximum value,
  the control circuit is further configured to adapt the second time period to be applied in a subsequent drive cycle dependent on the second time period applied in the one drive cycle and dependent on the third time period determined in the one drive cycle,
  the second time period to be applied in the subsequent drive cycle is a sum of the second time period applied in the one drive cycle and an adjustment time period, and
  the adjustment time period is proportional to the third time period determined in the one drive cycle.

2. The flyback converter of claim 1, wherein the rectifier arrangement includes a diode coupled in parallel with the second switching element.

3. The flyback converter of claim 1, wherein the rectifier arrangement comprises a MOSFET with an integrated body diode.

4. The flyback converter of claim 1, wherein the predetermined transformer state is a state at which energy stored in the transformer is at least approximately zero.

5. The flyback converter of claim 1, wherein the control circuit is configured to detect the predetermined transformer state by evaluating one of the following voltages: a voltage across the first winding; a voltage across the first switching element; or a voltage across the second winding.

6. The flyback converter of claim 5, wherein the control circuit is configured to detect the predetermined transformer state by comparing the voltage across the first winding with a first reference voltage, by comparing the voltage across the first switching element with a second reference voltage, or by comparing the voltage across the second winding with a third reference voltage.

7. The flyback converter of claim 1, further comprising a capacitive charge storage element coupled between the input terminals.

8. The flyback converter of claim 1, wherein the transformer further comprises:
a plurality of n, with n>1, second windings inductively coupled with the first winding;
a plurality of n output terminal pairs; and
a plurality of n rectifier arrangements, each rectifier arrangement connected in series with one second winding, and each series circuit with one of the plurality of second windings and one of the plurality of rectifier arrangements connected between one of the plurality of output terminal pairs;
wherein the control circuit is configured in the one drive cycle to switch on the first switching element for the first time period, and to switch on one of the second switching elements for the second time period, wherein the control circuit is further configured to individually adapt the second time period for each of the second switching elements.

9. The flyback converter of claim 1, wherein the first time period is constant.

10. The flyback converter of claim 1, wherein the adjustment time period is a fixed percentage of the third time period determined in the one drive cycle.

11. A flyback converter arrangement comprising:
a pair of input terminals;
a plurality of n, with n>1, pairs of output terminals;
a transformer with a first winding and with a plurality of n second windings coupled with the first winding;
a first switching element coupled in series with the first winding such that a first series circuit with the first switching element and the first winding is coupled between the input terminals;
a plurality of n rectifier arrangements, each rectifier arrangement connected in series with one second winding to form a plurality of second series circuits, each second series circuit having one of the plurality of second windings and one of the plurality of rectifier arrangements connected between one of the plurality of output terminal pairs, each rectifier arrangement comprising a second switching element; and
a control circuit configured in one drive cycle to switch on the first switching element for a first time period, after the first time period to switch on one of the plurality of the second switching elements for a second time period, to determine a third time period between an end of the second time period and a time at which the transformer assumes a predetermined transformer state, wherein:
  the control circuit determines the time at which the transformer assumes the predetermined transformer state by comparing a first voltage with a threshold, the first voltage comprising one of a voltage across the first switching element and a voltage across at least one of the plurality of second windings,
  the control circuit determines the threshold by determining a maximum value of the first voltage during the second and third time periods and weighting the determined maximum value,
  the control circuit is further configured to adapt the second time period associated with the one of the second switching elements to be applied in a subsequent drive cycle dependent on the second time period applied in the one drive cycle and the third time period determined in the one drive cycle,
  the second time period associated with the one of the second switching elements to be applied in the subsequent drive cycle is a sum of the second time period applied in the one drive cycle and an adjustment time period, and
  the adjustment time period is proportional to the third time period determined in the one drive cycle.

12. The flyback converter arrangement of claim 11, wherein the control circuit is configured to individually adapt second time periods associated with each of the second switching elements.

13. The flyback converter arrangement of claim 11, further comprising:
  a charge storage arrangement with a plurality of charge storage cells coupled in series,
  wherein the first series circuit is coupled in parallel with the charge storage arrangement, and wherein each of the second series circuits is coupled in parallel with at least one of the charge storage cells.

14. The flyback converter arrangement of claim 11, wherein the adjustment time period is a fixed percentage of the third time period determined in the one drive cycle.

15. A method for operating a flyback converter, the converter comprising:
  input terminals and output terminals;
  a transformer with a first winding and a second winding which are inductively coupled;
  a first switching element coupled in series with the first winding, a first series circuit with the first switching element and the first winding being coupled between the input terminals; and
  a rectifier arrangement coupled in series with the second winding, a second series circuit with the rectifier arrangement and the second winding being coupled between the output terminals, the rectifier arrangement comprising a second switching element,
  the method comprising:
    switching-on the first switching element for a first time period in one drive cycle;
    switching-on the second switching element for a second time period after the first time period;
    determining a predetermined transformer state comprising comparing a first voltage with a threshold, the first voltage comprising one of a voltage across the first switching element and a voltage across the second winding;
    determining the threshold comprising determining a maximum value of the first voltage during the second and third time periods and weighting the determined maximum value;
    determining a third time period between an end of the second time period and a time at which the transformer assumes the predetermined transformer state; and
    adapting the second time period to be applied in a subsequent drive cycle dependent on the second time period applied in the one drive cycle and the third time period determined in the one drive cycle, wherein adapting the second time period comprises
      determining the second time period to be applied in the subsequent drive cycle to be a sum of the second time period applied in the one drive cycle and an adjustment time period, and
      determining the adjustment time period to be proportional to the third time period determined in the one drive cycle.

16. The method of claim 15, wherein the rectifier arrangement includes a diode coupled in parallel with the second switching element.

17. The method of claim 15, wherein the rectifier arrangement comprises a MOSFET with an integrated body diode.

18. The method of claim 15, wherein the predetermined transformer state is a state at which energy stored in the transformer is at least approximately zero.

19. The method of claim 15, wherein determining the adjustment time period comprises determining the adjustment time period to be a fixed percentage of the third time period determined in the one drive cycle.

* * * * *